Feb. 14, 1933.　　　W. R. MURROW　　　1,897,324
SPEED CONTROL
Filed Jan. 27, 1930　　　2 Sheets-Sheet 1
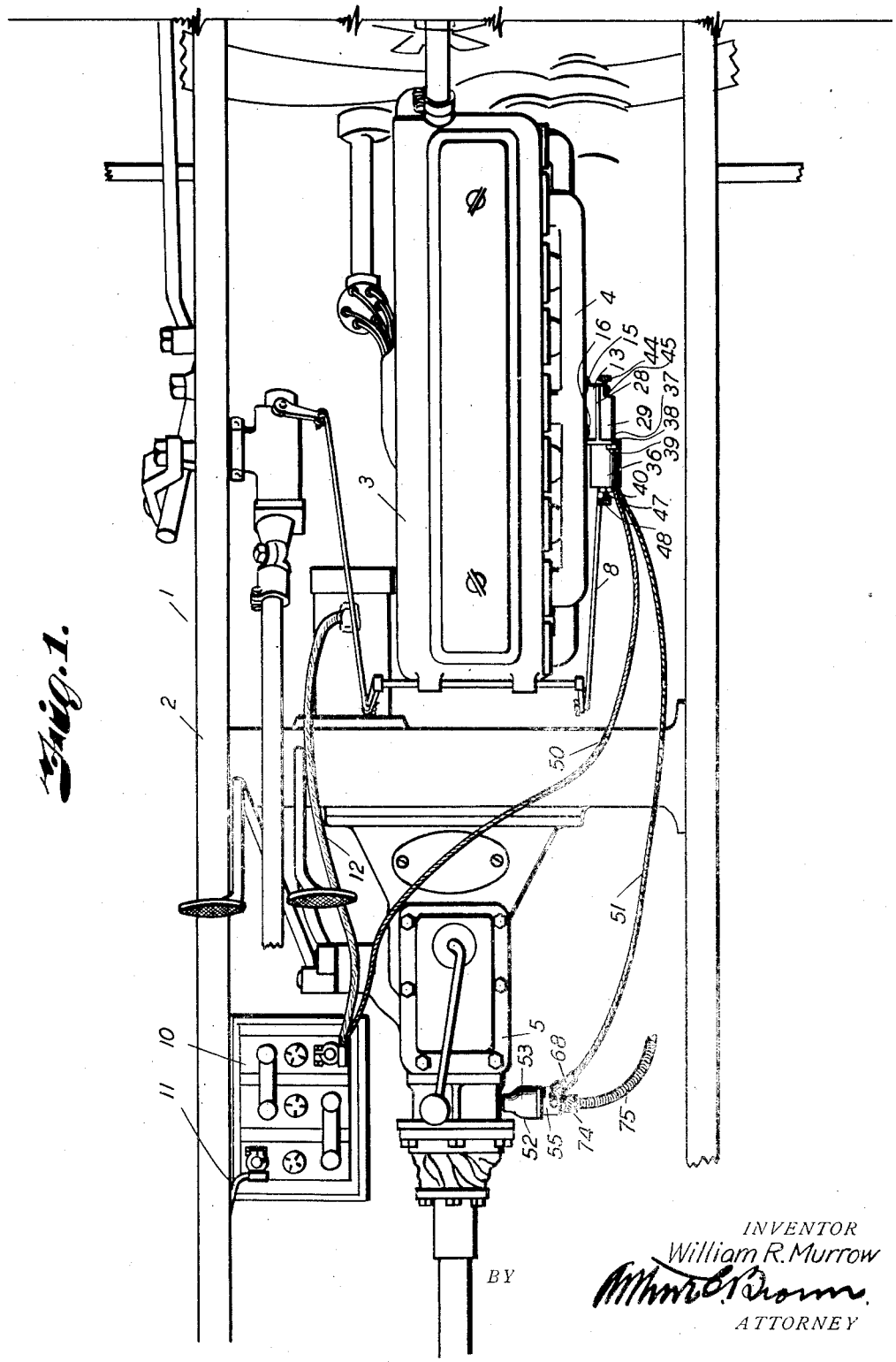
INVENTOR
William R. Murrow
BY
ATTORNEY Feb. 14, 1933. W. R. MURROW 1,897,324
SPEED CONTROL
Filed Jan. 27, 1930 2 Sheets-Sheet 2
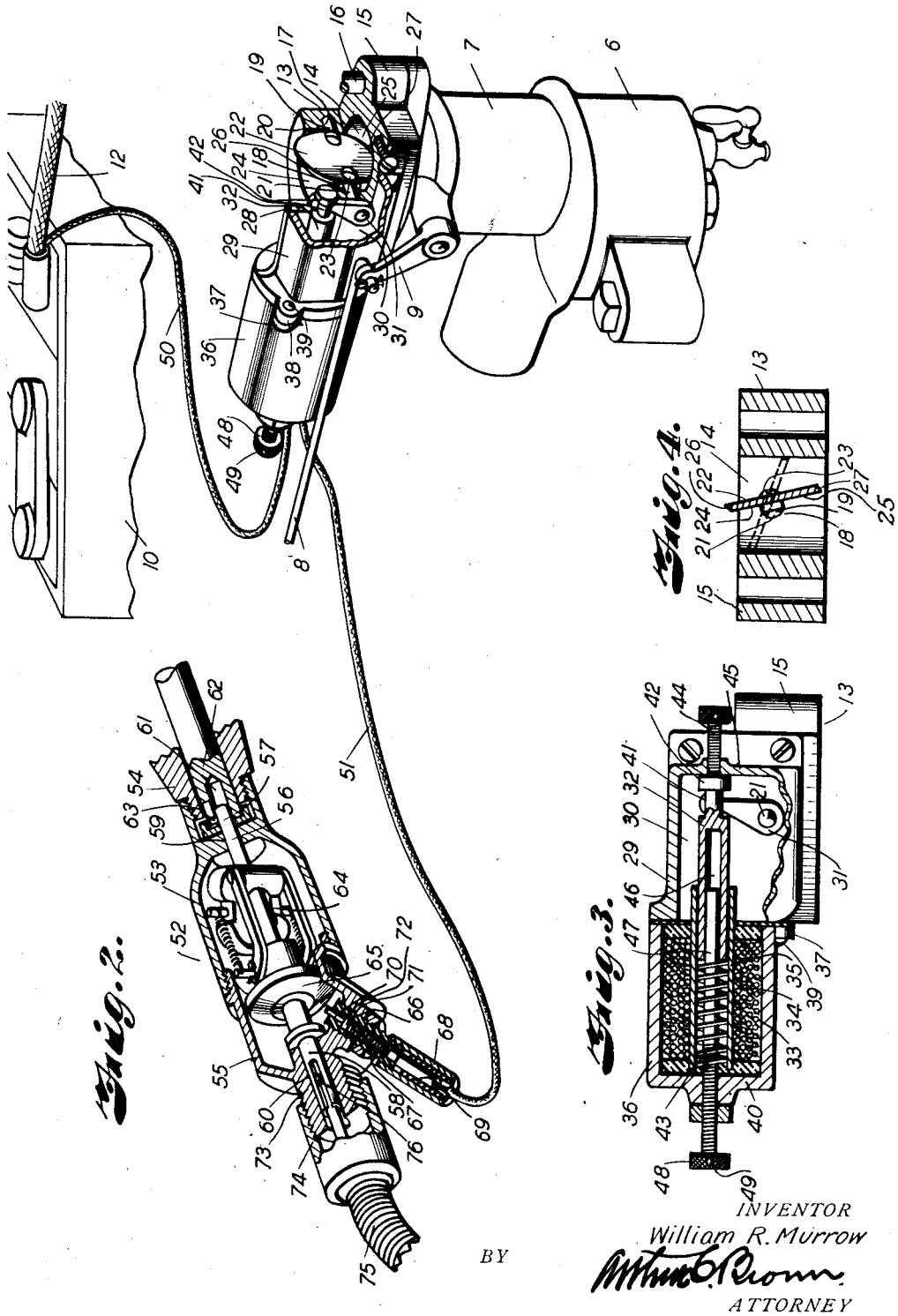
INVENTOR
William R. Murrow
BY Arthur C. Brown
ATTORNEY Patented Feb. 14, 1933

1,897,324

UNITED STATES PATENT OFFICE

WILLIAM R. MURROW, OF INDEPENDENCE, KANSAS, ASSIGNOR OF ONE-HALF TO O. W. COMPTON, OF INDEPENDENCE, KANSAS

SPEED CONTROL

Application filed January 27, 1930. Serial No. 423,875.

This invention relates to devices for controlling speed of automotive vehicles, and more particularly to devices of that character whereby maximum speed of the vehicle is limited by automatically shutting off fuel supply to the engine when the vehicle has attained a predetermined speed, the principal object of the invention being to provide for initially starting closure of the shut off valve when the vehicle has attained its predetermined speed and to automatically effect final closure and control of the valve indirectly through actuation of the accelerator by the operator of the vehicle.

In accomplishing this and other objects of the invention, I have provided improved details of structure, the preferred forms of which are illustrated in the accompanying drawings, wherein:

Fig. 1 is a plan view of a portion of an automotive vehicle equipped with my invention.

Fig. 2 is an enlarged perspective view of my improved apparatus mounted on a carburetor, a governor adapted to control the circuit to the device and a battery, parts being broken away for better illustration and parts of the normal equipment of an automobile being shown fragmentarily.

Fig. 3 is a longitudinal central section through the solenoid housing.

Fig. 4 is a vertical central section through the valve housing and valve illustrating the flow checking position of the valve in dotted lines.

Referring in detail to the drawings:

1 designates an automobile including frame members 2, an engine 3 having an intake manifold 4, a transmission case 5, a carburetor 6 and a suction line including an outlet 7 from the carburetor for conducting mixed fuel from the carburetor to the intake manifold and cylinders.

In vehicles of the character described, means including a rod 8 connected to a crank 9 is adapted to operate a butterfly throttle valve in the suction line for controlling flow of fuel therethrough, the rod being automatically operated by an accelerator pedal or similar convenient means.

Automobiles are also ordinarily provided with a battery 10 grounded in the frame as at 11 and wires 12 whereby current from the battery is supplied to the ignition system of the engine.

My invention includes a valve housing 13 having a cylindrical vertical bore or passage 14 comprising a valve chamber, and provided with lateral lugs 15 to receive bolts 16 for mounting the housing on the carburetor outlet between said outlet and the inlet manifold, whereby mixed fuel will pass through the housing to the manifold.

A journal socket 17 and a journal opening 18 are formed in the wall of the passage at opposite points offset from the diameter of the passage. A shaft 19 rectangular in cross section has opposite cylindrical ends 20 and 21 mounted in the socket 17 and opening 18 respectively, and a butterfly valve 22 comprising an elliptical plate having a short diameter substantially equal to the diameter of the passage is fixed to the shaft by screws 23 with the long axis of the valve extending vertically. The shaft extends across the valve substantially on the short axis thereof and parallel thereto to divide the same into unequal upper and lower portions 24 and 25, and the valve is mounted on one side of the shaft so that one face of the valve may extend vertically substantially centrally in the passage, and the opposite face will lie in an offset position from the center of the passage.

The valve is normally retained in slightly tilted position as illustrated in Fig. 4, as presently described.

The influence of vaporous fuel passing through the housing will therefore tend to move the valve rotatively in anti-clockwise direction in Fig. 4 to engage the periphery of the valve with the wall of the bore. The edges of the valve portions are oppositely beveled, conformably to the contour of the wall when engaged therewith, as indicated at 26 and 27 to cause a substantial area of the edges of the plate to engage the wall when the plate extends in the angular position shown in dotted lines in Fig. 4 to close the suction line.

The housing member 13 is further provided with an upwardly extending side edge flange 28, and a bracket 29 comprising a casing having a horizontal longitudinal chamber 30 is fixed to the flange and side of the member 13 forming an operating chamber for a lever or crank 31 fixed to the protruding end 21 of the shaft 19 and a lever-operating core 32 of a solenoid 33 including a coil 34 and a tubular body 35 mounted in a housing 36 having end flanges 37 secured to ears 38 of the bracket 29 by bolts 39 and an outer end wall 40. The core has a reduced neck 41 and a head 42 engaging the upper end of the lever 31, whereby when the solenoid is energized as presently described, the core will move to the left in Fig. 3 and tilt the lever for pivotally moving the valve toward passage-closing position.

A coil spring 43 mounted in the tubular body 35 and bearing against the end wall 40 of the housing, tends to urge the core outwardly from the body, and normally retains the core and lever in such a position that the valve extends substantially vertically in the passage 14 to offer relatively little resistance to passage of fuel from the carburetor to the engine.

The movement of the core in one direction is limited by a set screw 44 mounted in the end wall 45 of the bracket casing, and adapted to engage the head 42 to retain the valve in slightly tilted position, and assure tilting of the valve as shown in dotted lines in Fig. 4, whereby anti-clockwise operation of the valve under influence of suction in the line is assured.

In order to assure delivery of small quantities of fuel to the engine while the solenoid is operating, the core is provided with an axial recess 46 and a screw or pin 47 having a threaded portion engaged in a threaded opening in the end wall 40 of the housing 36 extends into the recess a sufficient distance to receive the end wall of the recess when the core has been moved by the solenoid a predetermined distance, and thus prevent complete closure of the passage 14, the pin being adjustable to vary the effective path of the core and thus vary the extent to which the solenoid may tilt the valve.

The pin has a knurled head 48 with an opening 49 to receive a wire or the like that may be attached to an adjacent part of the apparatus and sealed to guard against molestation or change of position of the pin.

The solenoid is included in an electrical circuit including a lead 50 connected with the grounded battery and a conductor 51 adapted to be automatically grounded to close the circuit when the engine or automobile has attained a predetermined speed, the circuit being preferably controlled by a device generally designated 52 responsive to the speed of the automobile.

In the illustrated application of the invention, the device 52 includes a casing comprising an end member 53 mounted on the threaded collar 54 of a transmission ordinarily provided to receive the tubular end housing member of a flexible speedometer shaft, a member 55 screwthreadedly engaged with the member 53 to form the casing, a shaft 56 having opposite ends 57 and 58 journaled in axial openings 59 and 60 respectively in the casing members, the inner end 57 of the shaft being located in an end socket 61 of a stud 62 ordinarily provided to receive the speedometer shaft, and keyed thereto by a pin 63. A centrifugally operating governor 64 including a block 65 slidable on the shaft and operating in the well understood manner is grounded in the frame of the automobile through the transmission.

Mounted in an angularly extending threaded opening 66 in the end wall of the casing member 55, is an insulating bushing 67 having a projecting end supporting a tubular cap 68 in which a sleeve 69 fixed on the end of the conductor 51 is located, and a brush or pin 70 slidably mounted in a reduced end opening in the bushing projects into the casing in the path of the governor block and is yieldingly supported by a conductor spring 71 engaging the sleeve 69, whereby the block may engage the pin to close the circuit through the frame to the battery, and energize the solenoid to move the valve.

The bushing may be moved inwardly or outwardly from the casing, to space the same from the governor a desired distance for regulating the point at which the governor will affect the circuit, and the pin is provided with a head 72 against which the spring bears and which retains the pin in the bushing.

The governor casing may further be provided with a threaded extension 73 to receive the tubular housing member 74 of a speedometer shaft 75 and the speedometer and governor shafts may be keyed together by a pin 76, the casing thus being conveniently interposed between the transmission and the speedometer housing and affording a mounting for both the housing and the conductor 51.

In using the device, the set screw 44 is adjusted to obtain desired tilted position of the valve 22 and assure movement of the valve in an anti-clockwise direction in Fig. 4 under influence of suction in the manifold. The adjustment may be effected to promote the influence of suction for moving the valve after the solenoid has become effective, or to provide for operation of the valve solely by suction should the engine be idling, and the governor be actuated to an extent corresponding to a relatively high speed of movement of the automobile. The screw 47 will also be adjusted to limit the extent to which the solenoid may move the valve toward passage-closing position, or permit the suction in the line to move the valve.

The valve will normally be retained substantially in vertical position in the passage by the spring operating against the core of the solenoid, and will therefore not appreciably interfere with movement of fuel through the passage to the engine.

When the predetermined speed of the automobile is attained, the governor will engage the brush and close the circuit on one side through the solenoid to the battery, and the other side through the transmission to the frame in which the battery is grounded, thus causing the core to move and rotate the valve shaft and move the valve to obstruct the passage 14.

The solenoid need have only sufficient power to start the movement of the valve, since the relatively strong effect of suction, enhanced by the partial closure of the passage, will operate chiefly on the large lower portion of the valve and urge the same towards passage-closing position against the influence of the spring in the solenoid. The rate at which fuel is delivered to the engine is thus diminished, and the speed of the vehicle is automatically reduced.

The valve will remain approximately closed so long as the operator of the vehicle retains his foot on the accelerator pedal, but when the throttle valve is allowed to close, the suction in the line will be relieved, and the spring in the solenoid will be permitted to move the valve 22 to open position.

The valve therefore remains in position to limit supply of fuel to the engine, even after the circuit is broken by withdrawal of the governor block due to reduction of speed, until the operator closes the throttle valve, and thereby relieves the suction in the line permitting the spring in the solenoid to open the valve 22.

Attention is called to the fact that some fuel will still be supplied to the engine, and its operation will therefore not be entirely suspended.

Attention is further called to the means provided for adjusting the extent to which the solenoid may limit the closing movement of the valve. When conditions, for example depreciation in efficiency of the engine, require a larger minimum passage for fuel to the engine than originally provided, the valve itself need not be removed or changed, but the pin 47 may be moved inwardly in the housing 46.

What I claim and desire to secure by Letters Patent is:

1. A speed control device including in combination with a suction line of an automobile engine, and a throttle valve under the control of the operator of the engine for controlling flow of fuel through the line, means including a control valve operable by suction in the line for automatically limiting flow of fuel through the line, and means responsive to the speed of the engine for setting up operation of the control valve.

2. In a speed control device, in combination with an automobile engine including a carburetor, a fuel inlet, and a suction line connecting the carburetor with the inlet including a cylindrical portion, an elliptical valve having pivotal mounting above its transverse axis in said portion, and means responsive to the speed of the automobile for moving the valve toward line-closing position.

3. In a speed control device, in combination with an automobile engine including a carburetor, a fuel inlet, and a suction line connecting the carburetor with the inlet including a cylindrical portion, an elliptical valve having oppositely beveled opposite edges and having pivotal mounting above its transverse axis in said portion, and means responsive to the speed of the automobile for moving the valve.

4. Speed controlling apparatus including in combination with a suction line and a primary throttle valve for the line, an auxiliary valve responsive to suction in the line to throttle the line, a magnet having an armature operatively connected with the auxiliary valve, and speed responsive mechanism adapted for closing a circuit through the magnet.

5. Speed controlling mechanism including in combination with a suction line, a primary throttle valve for the line and a speed-responsive device, a solenoid having a circuit controlled by the speed-responsive device, an auxiliary throttle valve responsive to suction in the line and operatively connected with the solenoid core for throttling the line in response to a predetermined excess of suction in the line or energization of the solenoid, and yielding means for resisting throttling movement of the auxiliary valve.

In testimony whereof I affix my signature.

WILLIAM R. MURROW.